United States Patent [19]
Andres et al.

[11] 4,032,174
[45] June 28, 1977

[54] SAFETY BELT SYSTEM IN A VEHICLE

[75] Inventors: Rüdolf Andres, Sindelfingen; Heinz W. Knoll, Aidlingen, both of Germany

[73] Assignee: Daimler-Benz Aktiengesellschaft, Germany

[22] Filed: Nov. 28, 1975

[21] Appl. No.: 635,753

[30] Foreign Application Priority Data
Nov. 30, 1974 Germany .......................... 2456670

[52] U.S. Cl. ............................... 280/745; 297/388
[51] Int. Cl.² .......................................... B60R 21/10
[58] Field of Search .......... 280/744, 745, 746, 747; 180/82 C; 297/388; 244/122 AG, 122 B; 242/107.1

[56] References Cited
UNITED STATES PATENTS

| | | | |
|---|---|---|---|
| 2,814,504 | 11/1957 | Campbell | 242/107.1 X |
| 3,421,711 | 1/1969 | Broix | 297/388 X |
| 3,845,836 | 11/1974 | Bendler | 280/744 X |
| 3,879,054 | 4/1975 | Lindblad | 280/747 |
| 3,951,430 | 4/1976 | Schwanz | 280/744 |

*Primary Examiner*—Joseph F. Peters, Jr.
*Assistant Examiner*—R. Schrecengost
*Attorney, Agent, or Firm*—Craig & Antonelli

[57] ABSTRACT

A safety belt system in a motor vehicle in which the belt band, when reaching a predetermined deceleration value, is tightened against the user with an initial load precluding injury by the use of a tensioning device actuated by an auxiliary force; the tensioning device is thereby constructed as a structural part which is adapted to be set into rotary movement and at least partly surrounds the belt band whereby the belt band runs through the structural part during normal operation in a substantially frictionless manner.

32 Claims, 3 Drawing Figures

SAFETY BELT SYSTEM IN A VEHICLE

The present invention relates to a safety belt system in a vehicle, especially in a motor vehicle, whereby the belt band upon reaching a predetermined deceleration value is tightened against the user with an initial stress precluding an injury by means of a tensioning device actuated by an auxiliary force, triggered by a shifting command.

Such an installation is described, for example, in the German Offenlegungsschrift No. 1,630,477 whereby it is proposed, inter alia, to realize the tensioning operation by means of a hydraulically operating piston-cylinder unit. However, it has been found that such pullback devices can be accommodated only rarely in a non-disturbing manner by reason of the great structural length necessary therefor.

For purposes of avoiding this disadvantage, it has also been suggested already to drive the roller of a belt-roller in an automatic belt system in case of danger for purposes of winding-up the belt band. This installation, however, is very complicated and expensive and at any rate requires so much space that an accommodation, for example, within a customary door column, is only limitedly possible.

Accordingly, it is the aim of the present invention to provide a tensioning device which does not entail the aforementioned disadvantages of the prior art installations. In particular, great value is placed on the fact that the installation can be effectively utilized with all belt systems and therewith is not tied to any particular location for its installation. Also, a subsequent equipment of already installed safety belts with the tensioning device of the present invention should be possible in a simple manner.

Consequently, a safety belt system in a vehicle, especially in a motor vehicle, is proposed whereby the belt band upon reaching a predetermined deceleration value, triggered by a shifting command, is tightened against the user with an initial load precluding an injury by means of a tensioning device actuated by an auxiliary force, whereby according to the present invention the tensioning device is constructed as a structural part adapted to be set into rotary movement and at least partly surrounding the belt band, with the belt band running through the strucural part during normal operation.

The structural part may thereby represent an approximately fork-shaped flat body in the manner of a winch or reel.

It is of advantage if the structural part is constructed as roller with preferably circular cross section.

A rapid response in case of danger and a practically frictionless normal-driving operation is achieved if the belt band runs through a longitudinal slot of the structural part which extends preferably in the direction of the axis of rotation.

In a preferred embodiment of the present invention, the longitudinal slot is constructed as elongated opening or hole. The structural part is thereby preassembled in the correct position and safe against loss.

A saving in cost is possible if the structural part takes the place of a deflection fitting.

For purposes of achieving a uniform tension in all belt sections, it is appropriate if, beginning with a predetermined tensional load acting on the structural part, the latter is displaceable in the direction of the already tightened section of the belt band.

A displacement movement can be achieved in a simple manner if the driving member of the structural part is connected with a fixed vehicle part by way of a deformation member bent approximately in the shape of a hair pin.

Accordingly, it is an object of the present invention to provide a safety belt system for motor vehicles which avoids by simple means the aforementioned shortcomings and drawbacks encountered in the prior art.

Another object of the present invention resides in a safety belt system of a vehicle which can be readily accomodated in customary parts of the vehicle such as door columns.

A further object of the present invention resides in a safety belt system for motor vehicles which is simple in construction, relatively inexpensive in manufacture and readily installable in a spacesaving manner.

Another object of the present invention resides in a safety belt system for motor vehicles in which the tensioning device is not tied to any particular location for its installation and which also offers the possibility of subsequent installation into existing safety belt sytems.

A further object of the present invention resides in a safety belt system of the type described above which assures a rapid response in case of danger and a practically frictionless operation under normal conditions.

Still another object of the present invention resides in a safety belt system of the type described above in which means are provided to permit equalization in the tension of the different sections of the belt band when the tensioning device is triggered in case of danger.

These and other objects, features and advantages of the present invention will become more apparent from the following description when taken in connection with the accompanying drawing which shows, for purposes of illustration only, one embodiment in accordance with the present invention, and wherein.

Figure 1:
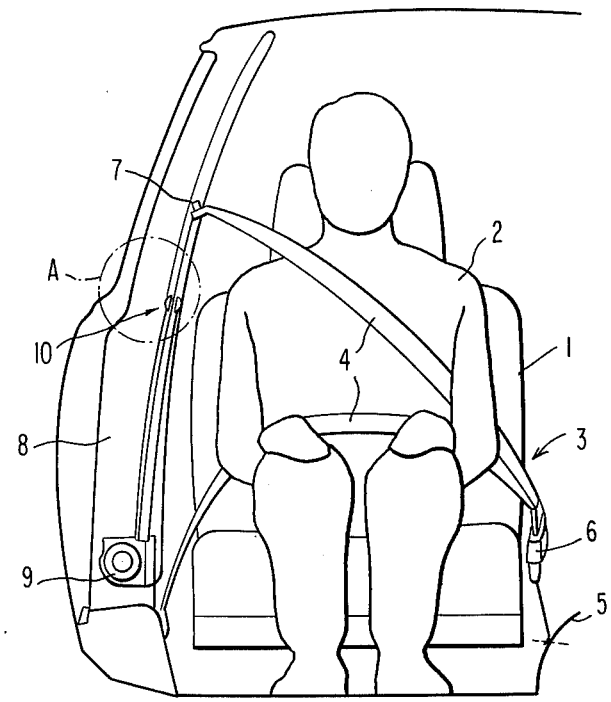
FIG. 1 is a schematic end elevational view showing the overall system of an automatic three-point belt system with the tensioning device in accordance with the present invention schematically indicated therein.

Referring now to the drawing wherein like reference numerals are used throughout the various views to designate like parts, according to FIG. 1, a person 2 seated on a vehicle seat 1 is retained by a three-point safety belt system generally designated by reference numeral 3 which essentially consists of the belt band 4, of a belt lock 6 connected with the Cardan tunnel 5, of a deflection fitting 7 and of an automatically locking belt roller 9 accommodated in a door column 8. The parts so far described are of conventional construction, forming no part of the present invention. A tensioning device generally designated by reference numeral 10 is indicated in FIG. 1 between the delfection fitting 7 and the automatic belt roller 9 which is located within the circular area designated by reference character A.

Figure 2:
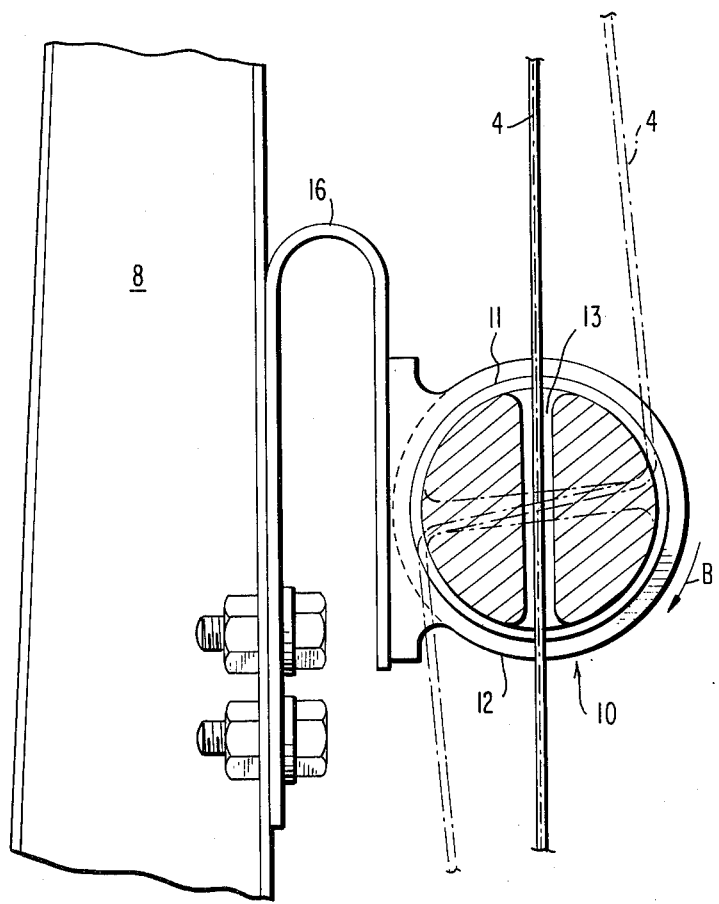
FIG. 2 is a partial elevational view, on an enlarged scale, indicating the details of the parts located in the circular area A in FIG. 1, and including the tensioning device in accordance with the present invention.
Figure 3:
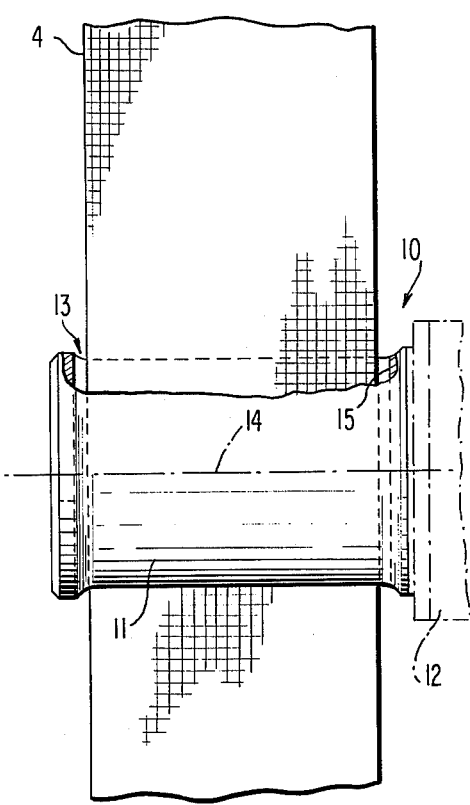
FIG. 3 is a right side elevational view of the details shown in FIG. 2.

This area A is illustrated on an enlarged scale in FIGS. 2 and 3. The tensioning device 10 is thereby formed by a structural part 11 which can be set into rotary movement by a flangedly connected driving member 12 which is of any conventional construction and therefore not illustrated in detail. This takes place when a conventional sensor adjusted, for example, to a predetermined deceleration value gives a shifting command. With a correspondingly constructed structural part, the drive unit may also be arranged on the inside thereof.

The structural part 11 which in the illustrated embodiment is formed by a roller, includes a longitudinal slot 13 which extends in the direction of the axis of rotation 14 (FIG. 3) and which is traversed by the belt band 4 without friction during normal driving operation. As additionally shown in FIG. 3, the longitudinal slot 13 may be constructed as elongated aperture 15. However, it is also possible to provide the roller with an entrainment member projecting therefrom and at least partly surrounding the belt band.

The driving member 12 is connected with the door column 8 by way of a deformation member 16 bent approximately in the shape of a hair pin (FIG. 2). It would also be possible to guide the driving member 12 vertically within a rail. If now the driving member 12 is triggered in case of a collision, then the strucural part 11 rotates in the direction of the arrow "B" shown in FIG. 2 and thereby takes along the belt band 4—as indicated in dash and dot lines. A double-layered wind-up of the belt band 4 thus takes place so that already after a few rotations the belt looseness can be eliminated.

As a rule, it will be such that the section of the belt band 4 between the structural part 11 and the belt roller 9 has less belt-looseness than the remaining part of the belt band. This would lead to the fact that the first-mentioned section, i.e., between the structural part 11 and the belt roller 9 would be tightened rapidly whereas the remaining belt band 4 would not abut with the desired initial load at the body of the user. This fact is taken into consideration by the already described deformation member 16 in that the deformation member 16, beginning with a predetermined load, enables a displacement of the entire tensioning device 10 in the direction of the belt roller 9.

It should also be pointed out that the installation of the tensioning device 10 in accordance with the present invention is not limited in any way to the illustrated embodiment. Instead, all customary belt systems can be equipped therewith in a simple manner and can also be equipped therewith subsequently whereby the tensioning device 10 may be provided at any place considered appropriate.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A safety belt system for a vehicle, which comprises a belt band means for encompassing a user and a tensioning means for tightening the belt band means against said user with an initial load precluding injury upon reaching a predetermined deceleration value, characterized in that the tensioning means includes a structural part being rotatable and at least partly surrounding the belt band means, said belt band means being freely movable through the structural part during normal operation.

2. A safety belt system according to claim 1, characterized in that the tensioning means is actuated by an auxiliary force triggered by a shifting command upon reaching the predetermined deceleration.

3. A safety belt system according to claim 2, characterized in that the belt band means is freely movable through the structural part substantially frictionless during normal operation.

4. A safety belt system according to claim 1, characterized in that the structural part is an approximately fork-shaped flat member being rotatable in the manner of a winch.

5. A safety belt system according to claim 1, characterized in that the structural part is constructed as roller means.

6. A safety belt system according to claim 5, characterized in that the roller means has a circularly shaped cross section.

7. A safety belt system according to claim 1, characterized in that the belt band means extends through a longitudinal slot of the structural part, said slot extending approximately in the direction of the axis of rotation.

8. A safety belt system according to claim 7, characterized in that the longitudinal slot is constructed as elongated aperture.

9. A safety belt system according to claim 8, characterized in that the structural part replaces a deflection fitting in the belt system.

10. A safety belt system according to claim 1, characterized in that the structural part is set into rotary movement by a driving means, and in that the driving means of the structural part is connected with a fixed vehicle part by way of a deformation member.

11. A safety belt system according to claim 10, characterized in that the deformation member is bent approximately in the shape of a hair pin.

12. A safety belt system according to claim 11, characterized in that the tensioning means is actuated by an auxiliary force triggered by a shifting command upon reaching the predetermined deceleration.

13. A safety belt system for a vehicle, which comprises a belt band means and a tensioning means for tightening the belt band means against a user with an initial load precluding injury upon reaching a predetermined deceleration value, characterized in that the tensioning means is constructed as a structural part operable to be set into rotary movement and at least partly surrounding the belt band means, and the belt band means running through the structural part during normal operation, characterized in that the belt band means extends through a longitudinal slot of the structural slot extending approximately in the direction of the axis of rotation, and characterized in that beginning with a predetermined tensional load acting on the structural part, the structural part is displaceable in the direction of the already tightened section of the belt band means.

14. A safety belt system according to claim 13, characterized in that the structural part is set into rotary movement by a driving means, and in that the driving means of the structural part is connected with a fixed vehicle part by way of a deformation member.

15. A safety belt system according to claim 14, characterized in that the deformation member is bent approximately in the shape of a hair pin.

16. A safety belt system according to claim 15, characterized in that the tensioning means is actuated by an auxiliary force triggered by a shifting command upon reaching the predetermined declaration.

17. A safety belt system according to claim 15, characterized in that the structural part is an approximately fork-shaped flat member in the manner of a winch.

18. A safety belt system according to claim 15, characterized in that the structural part is contructed as roller means.

19. A safety belt system according to claim 13, characterized in that the tensioning means is actuated by an auxiliary force triggered by a shifting command upon reaching the predetermined deceleration.

20. A safety belt system according to claim 19, characterized in that the belt band means runs through the structural part substantially frictionless during normal operation.

21. A safety belt system according to claim 13, characterized in that the structural part is an approximately fork-shaped flat member in the manner of a winch.

22. A safety belt system according to claim 13, characterized in that the structural part is constructed as roller means.

23. A safety belt system according to claim 22, characterized in that the roller means has a circularly shaped cross section.

24. A safety belt system according to claim 13, characterized in that the longitudinal slot is constructed as elongated aperture.

25. A safety belt system for a vehicle, which comprises a belt band means and a tensioning means for tightening the belt band means against a user with an initial load precluding injury upon reaching a predetermined deceleration value, characterized in that the tensioning means is constructed as a structural part operable to be set into rotary movement and at least partly surrounding the belt band means, and the belt band means running through the structural part during normal operation, and characterized in that beginning with a predetermined tensional load acting on the structural part, the structural part is displaceable in the direction of the already tightened section of the belt band means.

26. A safety belt system according to claim 25, characterized in that the structural part is set into rotary movement by a driving means, and in that the driving means of the structural part is connected with a fixed vehicle part by way of a deformation member.

27. A safety belt system according to claim 26, characterized in that the deformation member is bent approximately in the shape of a hair pin.

28. A safety belt system according to claim 25, characterized in that the tensioning means is actuated by an auxiliary force triggered by a shifting command upon reaching the predetermined deceleration.

29. A safety belt system according to claim 28, characterized in that the belt band means runs through the structural part substantially frictionless during normal operation.

30. A safety belt system according to claim 25, characterized in that the structural part is an approximately fork-shaped flat member in the manner of a winch.

31. A safety belt system according to claim 25, characterized in that the structural part is constructed as roller means.

32. A safety belt system according to claim 31, characterized in that the roller means has a circularly shaped cross section.

* * * * *